July 17, 1923.
W. HILDEBRAND
1,461,845
CONTROL VALVE FOR AIR BRAKES
Filed July 21, 1920
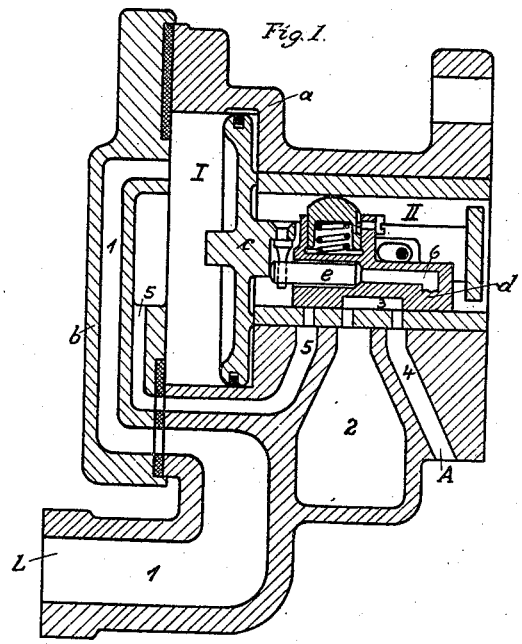
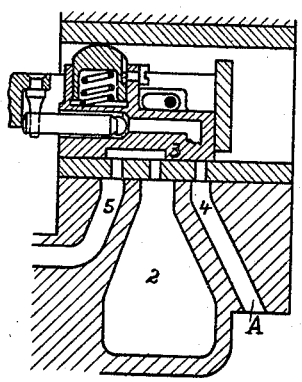
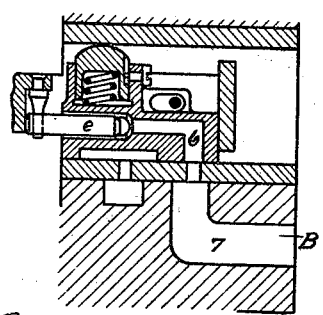
Inventor
Wilhelm Hildebrand
By Cushman, Bryant & Darby
attys Patented July 17, 1923.

1,461,845

UNITED STATES PATENT OFFICE.

WILHELM HILDEBRAND, OF LICHTENBERG, BERLIN, GERMANY, ASSIGNOR TO KNORR-BREMSE AKTIENGESELLSCHAFT, OF LICHTENBERG, BERLIN, GERMANY.

CONTROL VALVE FOR AIR BRAKES.

Application filed July 21, 1920. Serial No. 398,037.

*To all whom it may concern:*

Be it known that I, WILHELM HILDEBRAND, a citizen of the German Republic, residing at Neue Bahnhofstrasse 9–17 Lichtenberg, Berlin, Germany, have invented certain new and useful Improvements in or Relating to Control Valves for Air Brakes (for which I have received patents as follows: Germany, No. 296,810, dated 19th May, 1916; Austria, No. 76,620, dated 23rd November, 1916; Hungary, No. 73,927, dated 24th November, 1916; Great Britain, No. 106,464, dated 13th December, 1916; Sweden, No. 44,869, dated 6th December, 1916; and Finland, No. 7,802, dated June 21st, 1919), of which the following is a specification.

In the so-called brake-accelerators, in which the main brake-pipe is exhausted into a chamber, this chamber is constructed of such a size that when moving the controlling piston in the braking position a substantial part of the volume of the brake pipe is included therein. This is not only the case in those brake accelerators which only operate in the case of quick brake applications, in which it is an advantage to exhaust the brake pipe completely as quickly as possible, but also in those brake accelerators which come into operation in service braking applications. In the latter it is assumed that about one-sixth to one-twelfth of the capacity of the brake pipe is to be taken in by the chamber. In order to ensure also a corresponding decrease of pressure in the pipe, if brake-pipe vehicles are included in the train in question, these are also provided with brake-accelerators.

In consequence of this large removal of brake-pipe air the pressure in the pipe is reduced by at least half an atmosphere on the slightest application of the brake, so that the smallest degree of braking causes a disproportionate effect. This is a great disadvantage, especially when travelling on rather slight down grades, as on these the train, by the action of even the smallest braking effect, may be brought to a stand-still.

In the arrangement of brake-accelerators for service brake applications it has been considered necessary to draw off for each vehicle a certain large quantity of air from the pipe, in order to augment and accelerate thereby the wave of air produced from the footplate outwards in the pipe. However experiments have proved that apart from the large removal of brake-pipe-air employed in quick-action brakings but generally inadmissible in service brakings, no acceleration of the air wave is produced by the employment of chambers into which the main-brake pipe is exhausted, so that for instance the air-wave in a train equipped with brake accelerators of this kind does not reach the end of the train any more quickly than if all the control valves and brake-accelerators were switched off from the brake-pipe in question.

According to the present invention expansion chambers are not employed to exhaust the brake-pipe, but only to remove the disturbing influence which the volume of air expelled by the controlling piston of the control valve in braking would exert on the wave of air passing rapidly through the pipe. The chamber is accordingly only made of such a size that it can take in the control-piston displacement volume or a little more. If when effecting a brake-application the controlling piston of the first braked vehicle is reversed into the braking position, and consequently the piston chamber is connected with the expansion chamber, the piston-displacement-volume of the former is taken in by the latter, and is not, as with ordinary control valves, compressed into the brake-pipe, so that the wave of air moving along the train pipe can pass without hindrance right to the end of the train.

A great advantage is thereby attained in that the lowest degree of braking is not effected by the expansion chamber, but is only dependent on the volume of air allowed to escape from the brake pipe through the driver's brake valve. It is then a matter of indifference whether the expansion chamber is exhausted in intermediate positions or in the release position of the control piston, as the control piston-displacement-volume taken up by the expansion chamber can have little or no influence on the magnitude of the degree of braking.

I will describe with reference to the accompanying drawing a construction in accordance with this invention but I do not limit myself to the precise construction described and illustrated.

Figure 1 is a section showing the control valve in the release position;

Figures 2 and 3 show in section the slide-valve part of the control valve in the braking position in two different parallel sectional planes.

Referring to the drawing the control valve consists as heretofore of a casing $a$, a cover $b$, a control piston $c$, a slide valve $d$ and a graduating valve $e$. At L is attached the brake pipe, which through a passage $l$, $l$ communicates with the chamber I to the left of the piston. The chamber II to the right of the piston is connected with the auxiliary air-reservoir. At B, (Figure 3), the brake-cylinder is attached. The opening A leads to the open air. The casing $a$ contains the expansion chamber 2. This communicates, as will be seen in Figure 1, in the release position, through the passage 3 of the slide valve and the passage 4, with the open air. If air, for the purpose of applying the brake, is let out of the pipe, the control piston goes to the left-hand end position and displaces the slide valve $d$ with the graduating valve $e$ into the position shown in Figures 2 and 3. The expansion chamber 2 is connected through the passage 3 of the D slide valve with the passage 5 leading to the piston chamber I. Consequently the air driven out of the chamber I by the piston $c$ enters the expansion chamber 2, so that it is not forced through the passage $l$ into the brake-pipe. In this position of the brake, as is shown in Figure 3, the auxiliary air reservoir communicates in the usual manner through the graduating valve $e$, slide-valve passage 6 and passage 7, with the brake cylinder.

The constructional example shows a control valve with only one braking position, in which the expansion chamber 2 can of course only communicate with the atmosphere in the release position, since no other position is provided for the purpose. The method of operating the valve is of course not of any consequence, as the capacity of the chamber 2 only corresponds to the volume of the chamber I and on this account cannot exert any influence on the fall of pressure in the pipe and therefore on the degree of braking.

What I claim and desire to secure by Letters Patent of the United States is:—

1. In a control valve for air brakes, a casing containing a piston chamber, a piston movable therein, and a slide valve adapted to be actuated by said piston, in combination with an expansion chamber to receive air from the front of the piston, said casing being provided with a passage forming an open communication between said piston chamber and the main brake pipe, and also with a separate passage having an inlet located permanently in front of said piston and an outlet controlled by said slide valve and adapted to place said expansion chamber in direct communication through said slide valve with said piston chamber.

2. In a control valve for air brakes, a casing containing a piston chamber, a piston movable therein, and a slide valve adapted to be actuated by said piston, in combination with an expansion chamber normally open to the atmosphere, said casing being provided with a passage forming an open communication between said piston chamber and the main brake pipe, and also with a separate passage leading from the front to the back of the piston, said last-named passage being controlled by said slide valve and adapted to place said expansion chamber in direct communication with said piston chamber, said slide valve being also adapted to close the atmospheric connection of said expansion chamber when opening said passage between said expansion chamber and piston chamber.

3. A control valve for air brakes having in conbination with a casing a piston chamber, a piston movable therein, a slide valve actuated by said piston, an expansion chamber and a passage to atmosphere, and means in said chamber and slide valve for forming communication of the expansion chamber with the piston chamber at one position of the said slide valve and the said passage at another position of the said slide valve.

WILHELM HILDEBRAND.